United States Patent [19]

Vrolyk et al.

[11] 4,286,574

[45] Sep. 1, 1981

[54] TRICKLE-TYPE THERMAL STORAGE UNIT

[75] Inventors: John J. Vrolyk, Northridge; Ronald P. Pauckert, Canoga Park, both of Calif.

[73] Assignee: Rockwell International Corporation, El Segundo, Calif.

[21] Appl. No.: 126,634

[22] Filed: Mar. 3, 1980

[51] Int. Cl.³ .................. F24H 7/00; F24J 3/02; F28D 13/00

[52] U.S. Cl. .................... 126/400; 126/430; 126/436; 165/4

[58] Field of Search .......... 126/430, 436, 437, 400; 165/104 S; 62/437

[56] References Cited

U.S. PATENT DOCUMENTS

| 4,037,583 | 7/1977 | Bakun | 126/430 |
| 4,064,931 | 12/1977 | Laing | 126/400 |
| 4,137,898 | 2/1979 | Koizumi | 126/436 |
| 4,194,496 | 3/1980 | Karlson | 165/104 S |

FOREIGN PATENT DOCUMENTS 2409463 7/1979 France .................. 126/900

Primary Examiner—Albert W. Davis
Assistant Examiner—G. Anderson
Attorney, Agent, or Firm—H. F. Hamann; Robert M. Sperry

[57] ABSTRACT

A method and apparatus for thermal storage having a movable manifold which discharges thermal transfer fluid to trickle through a particulate solid thermal storage medium to be collected for distribution or recirculation in a manner such as to establish a vertical thermocline within said thermal storage medium, said thermocline being movable horizontally with said manifold.

10 Claims, 9 Drawing Figures

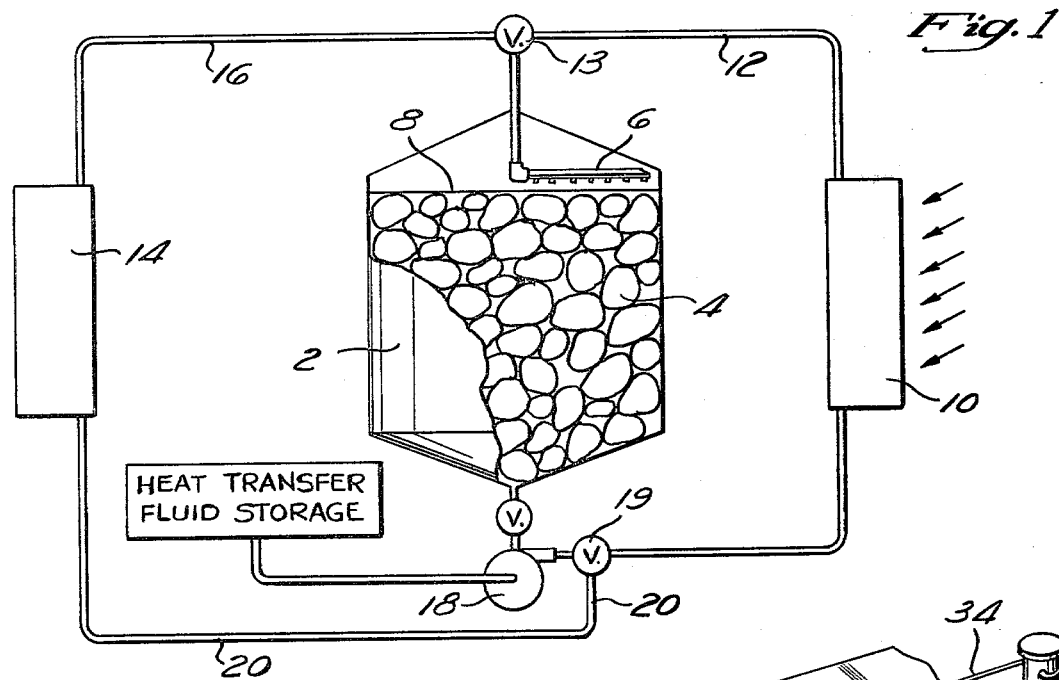
Fig. 1
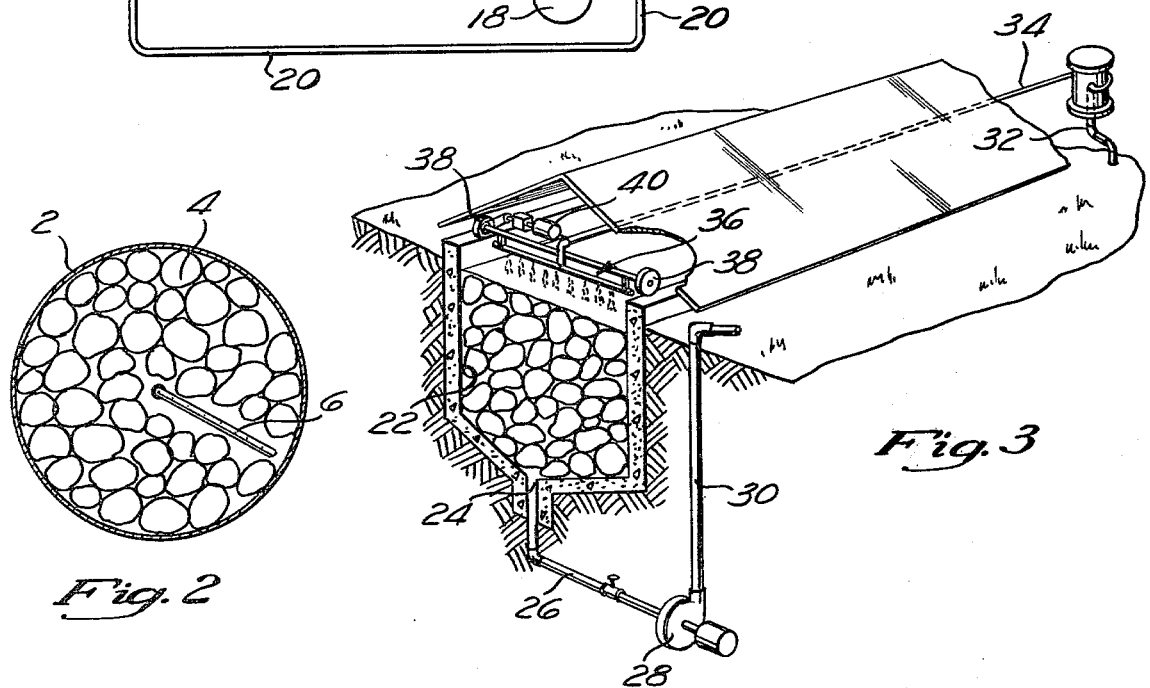
Fig. 2
Fig. 3
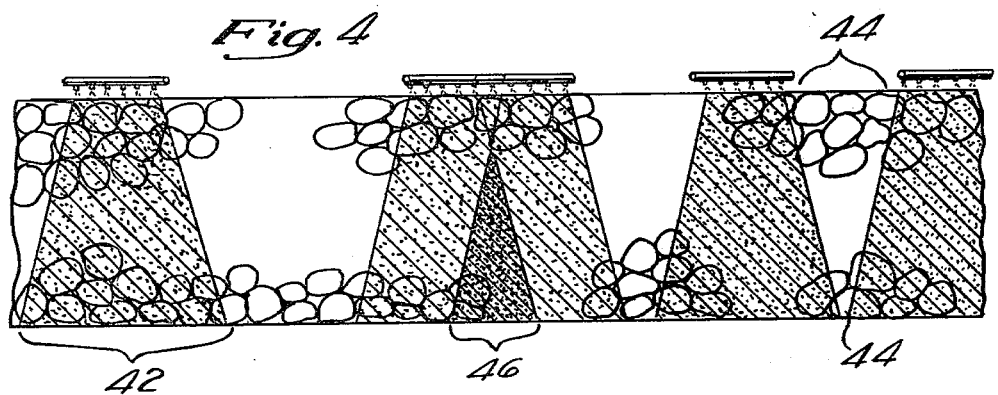
Fig. 4

TRICKLE-TYPE THERMAL STORAGE UNIT

BACKGROUND OF THE INVENTION

1. Field of the Invention

This invention relates to thermal storage methods and apparatus, and is particularly directed to thermal storage methods and apparatus whereby a movable manifold discharges a thermal transfer fluid, such as silicone oil, to trickle through a particulate solid thermal storage medium, such as a quantity of rocks, and to be collected thereafter for distribution or for recirculation in a manner such as to establish a vertical thermocline within said thermal storage medium, said thermocline being movable horizontally with said manifold.

2 Description of the Prior Art

In the current search for alternative sources of energy, considerable attention has been devoted to solar energy. Various techniques have been proposed for converting solar energy into thermal energy. Unfortunately, the prior art has taught no satisfactory method for storing thermal energy.

U.S. Pat. No. 3,369,541, issued Feb. 20, 1968 to Harry E. Thomason, discloses a prior art thermal storage system. However, in this system the liquid does not travel through the solid medium and does not provide a definitive thermocline.

U.S. Pat. No. 4,010,731, issued Mar. 8, 1977 to Henry Harrison, teaches a thermal storage system in which heat rises to the top of the solid medium only by convection. Moreover, a large quantity of thermal transfer fluid is required for Harrison's system, since he requires that the fluid completely fill all spaces between the solid medium.

U.S. Pat. No. 4,037,583, issued July 26, 1977 to Paul Bakun, teaches a thermal storage system employing separate manifolds for charging and extracting fluid. This requires that heat travel sideways through the bed by natural conduction and convection. This system also requires a large quantity of thermal transfer liquid and it appears unlikely that this system would provide a thermocline.

U.S. Pat. No. 4,059,226, issued Nov. 22, 1977 to David L. Atkinson, teaches a thermal storage system that uses only air and rocks. No liquids are used. This system must be completely charged with heat before any heat can be withdrawn. The Atkinson system would appear to be expensive, since it requires a plurality of tanks together with the piping and valves necessary to guide the heat transfer fluid to the appropriate tank.

BRIEF SUMMARY AND OBJECTS OF THE INVENTION

These disadvantages of the prior art are overcome with the present invention and a thermal storage system is provided having a movable manifold which discharges a thermal transfer fluid to trickle through a particulate solid thermal storage medium, such as a quantity of rocks, to be collected thereafter for distribution or for recirculation in a manner such as to establish a vertical thermocline within said thermal storage medium, said thermocline being movable horizontally with said manifold.

This system requires only minimal quantities of thermal transfer fluid and only a single tank. Moreover, the valving required for charging and extraction is quite simple.

Accordingly, it is an object of the present invention to provide an improved method and apparatus for thermal storage.

Another object of the present invention is to provide a method and apparatus for thermal storage requiring minimal quantities of thermal transfer fluid.

An additional object of the present invention is to provide a method and apparatus for thermal storage requiring only a single tank and relatively simple valving.

A specific object of the present invention is to provide a method and apparatus for thermal storage having a movable manifold which discharges thermal transfer fluid to trickle through a particulate solid thermal storage medium to be collected for distribution or for recirculation in a manner such as to establish a vertical thermocline within said thermal storage medium, said thermocline being movable horizontally with said manifold.

These and other objects and features of the present invention will be apparent from the following detailed description, taken with reference to the accompanying drawings.

BRIEF DESCRIPTION OF THE DRAWINGS

FIG. 1 is a diagrammatic representation of a rotary thermal storage system embodying the present invention;

FIG. 2 is a plan view of the thermal storage system of FIG. 1;

FIG. 3 is a diagrammatic representation of a rectangular thermal storage system embodying the present invention;

FIG. 4 is a diagrammatic representation showing the dispersion pattern for fluid trickling through the thermal storage medium of the thermal storage system of FIG. 1;

DETAILED DESCRIPTION OF THE PREFERRED EMBODIMENT

Figure 5:
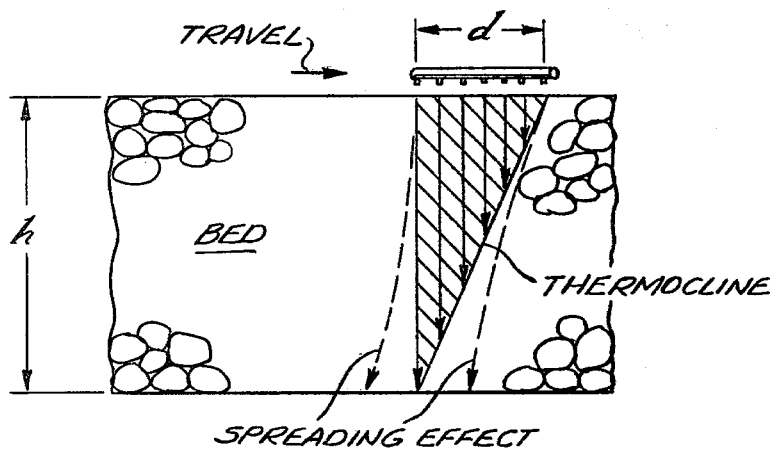
FIG. 5 is a diagrammatic representation showing the establishment of a vertical thermocline in the thermal storage system of FIG. 1.

In that form of the present invention chosen for purposes of illustration in FIGS. 1 and 2, the thermal storage system comprises a tank 2 filled with a particulate thermal storge medium 4, such as rocks, and a rotating spray head 6, similar to that used in aerating water at a sewage plant. In accordance with the present invention, a relatively small quantity of a suitable thermal transfer fluid 8, such as silicone oil, is heated by suitable heating means 10 and is delivered via conduits 12 and three-way valve 13 to the spray head 6 which allows the heated fluid 8 to trickle over the rocks 4 at a flow rate substantially determined by the gravity head. This serves to heat a small area of the rocks 4, from the top downward, until a vertical thermocline is established in this area. When this is accomplished, the spray head 6 is moved and the process is repeated until the entire bed of rocks 4 is heated uniformly.

To withdraw heat from the thermal storage system of the present invention, relatively cool thermal transfer fluid from heat exchanger 14 may be delivered via conduit 16 and three-way valve 13 to the spray head 6 in the manner described above. As the cool fluid trickles over the rocks 4, the fluid will absorb heat from the rocks 4 and can be circulated by a suitable pump 18, three-way valve 19, and conduits 20 to deliver the heat to the heat exchanger 14.

FIG. 3 illustrates an alternative form of the present invention employing a rectilinear trough 22 which is configured to drain to a common drainage point 24 which is connected by conduit 26, pump 28 and conduit 30 to deliver fluid output from the trough 22. Fluid input to trough 22 is delivered via conduit 32, flexible hose 34 and spray manifold 36 which is movable along the trough 22 by suitable means such as wheels 38 and motor 40.

The following is a brief analysis of the requirements of a control system which will automatically govern the speed with which the manifold is moved along the top of the bed. This type of control is only required in a system which utilizes the concept of continuously moving the manifold in a horizontal direction in contrast to the method in which the manifold is moved in increments, remaining stationary in one place until the bed is full of heat below it, after which it is quickly moved forward over a new portion of the bed. One disadvantage of utilizing the incremental method is that the fluid has a tendency to spread out beyond the edges of the manifold on its way down through the rock bed. This is a statistical effect created by the discrete and random distribution of the bed particles which cause repeated flow splitting. Thus, if a single orifice provides fluid to the top of a bed of aggregate, the flow of fluid will tend to spread out as indicated at 42 in FIG. 4. When discrete movement of the manifolds is used, an area is either skipped, as seen at 44 in FIG. 4, or is overlapped as shown at 46, depending on how far the manifolds are moved for each incremental step. The best way is to allow the skipped areas to exist and to place the manifolds during heat extraction back in the exact same spot as when the bed was charged. In this way heat flow and fluid temperature problems are avoided, but not all of the bed is utilized to store heat.

For simplicity, the following analysis of the continuous method does not take into account the spreading referred to above. This is justified since it can be observed that the spreading effect will be smeared out by continuos movement of the manifolds, and thus tend to be eliminated. As seen in FIG. 5, let:

h = bed height
d = manifold depth
w = manifold width
$v_t$ = thermocline vertical velocity
$v_m$ = manifold velocity
t = time for thermocline to transverse the vertical distance h Then from bed geometry, $h/v_t = t$; and in this time the manifold on the average must move forward a distance equal to its own depth, d, giving the manifold a speed of $v_m = d/t$. But t has the same value, and solving for t and setting the results equal, one obtains $h/v_t = d/v_m = t$, and $h/d = v_t/v_m$. For a given bed, h and d are relatively fixed and $v_t$ is a function of the flow rate and other relatively constant parameters. Thus, the manifold velocity is $v_m = d/hv_t$, and $v_t$ is a function of the following:

1. The fluid flow rate $= \omega_o$
2. The ratio of the volumetric heat capacities of the solid and of the fluid:

$$\rho_s(C_p)_s/\rho_l(C_p)_l$$

3. The fractions of the bed volume occupied by solid, liquid and gas defined by:

$$\gamma_s + \gamma_s + \gamma_g = 1$$

where
$\gamma_s$ = Fraction which is occupied by solids;
$\gamma_l$ = Fraction which is occupied by liquid;
$\gamma_g$ = Fraction which is occupied by gas.

Figure 6:
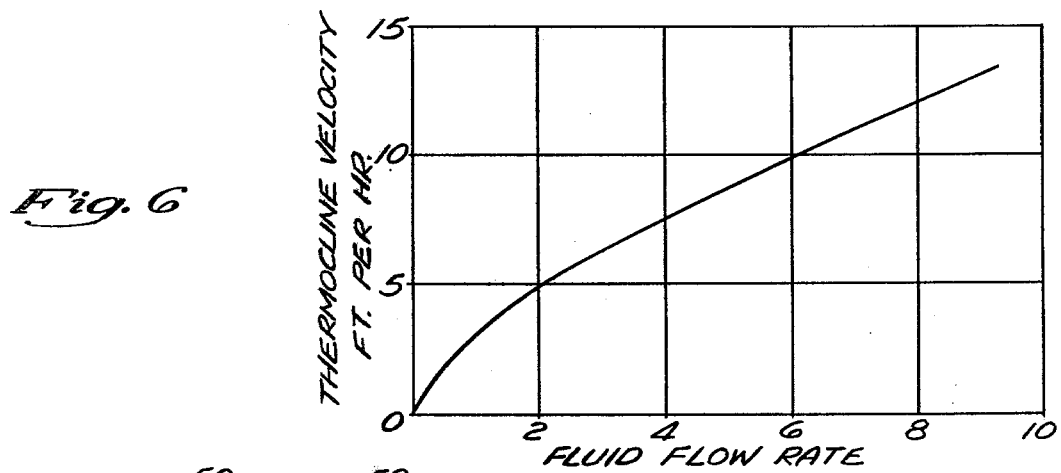
FIG. 6 is a curve showing the relationship between the fluid flow rate and the thermocline velocity in the thermal storage system of FIG. 1.

The velocity of the manifold must be adjusted and controlled to match the velocity of the thermocline so that the bed is entirely filled with heat to the very bottom, but filling is not continued beyond the full point. A control system measures the fluid flow rate and automatically adjusts the manifold velocity to the correct value according to the equation $v_m = d/hv_t$ derived above. For a given system, d and h are fixed, and the manifold velocity depends on $v_t$ which in turn is a function of the fluid flow rate since the density $\rho$ and heat capacity $C_p$ of the solid and fluid can be assumed to be relatively constant. For a given flow rate, the fractions $\gamma_s$, $\gamma_l$, and $\gamma_g$ defined above are constant. As flow rate increases, the solids fraction $\gamma_s$ stays constant, but the fractions $\gamma_l$ and $\gamma_g$ will change to an extent which is probably best determined experimentally. By making certain simplifying assumptions, working values can, however, be obtained from theory regarding thermocline velocity as a function of flow rate. This relation is shown in FIG. 6, which shows results of preliminary calculations of the relation between fluid flow rate and thermocline velocity in a trickle-type thermal storage bed (for use in control system algorithm).

Figure 7:
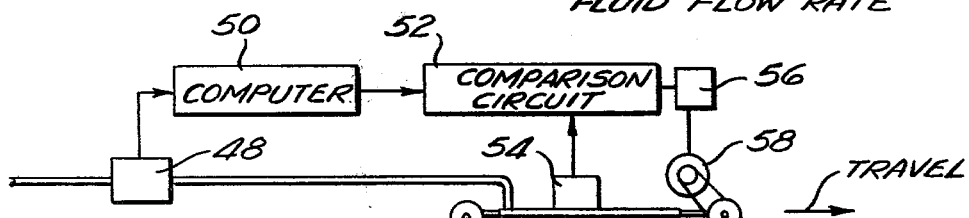
FIG. 7 is a diagrammatic representation showing a system for automatically positioning the fluid distribution manifold of the thermal storage system of FIG. 3.
Figure 7:
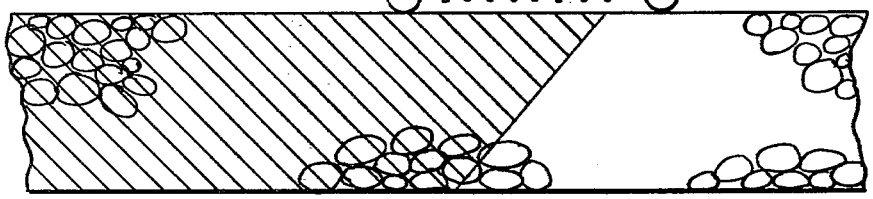

As seen in FIG. 7, the control system operates as follows: the fluid flow is measured continuously by flowmeter 48 and a simple computer 50 enters the algorithm shown in FIG. 6 to obtain a signal proportional to the thermocline velocity. This signal is multiplied by a constant equal to d/h of FIG. 5 to obtain the manifold velocity $v_m$. This is compared by comparison circuit 52 with a manifold velocity output signal measured by transducer 54, and any difference or error signal is sent to motor controller 56 to change the speed of the motor 58 driving the manifold in such a direction as to reduce the difference between the actual and the desired speed to zero. The speed of the manifold is thus kept proportional to the speed of the thermocline, with the result that the entire bed is loaded with heat, evenly, all along its horizontal length.

The thermocline velocity is substantially directly porportional to the volume flow rate of fluid entering at the top when charging, and exiting at the bottom when extracting heat. Thus, the velocity of the distribution manifold at the top is set by means of a control system to be proportional to the flow of fluid to the manifold.

Figure 8:
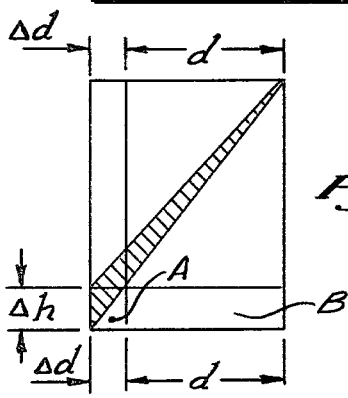
FIG. 8 is a diagrammatic representation showing the diffuse zone of the thermocline of the thermal storage system of FIG. 3.
Figure 9:
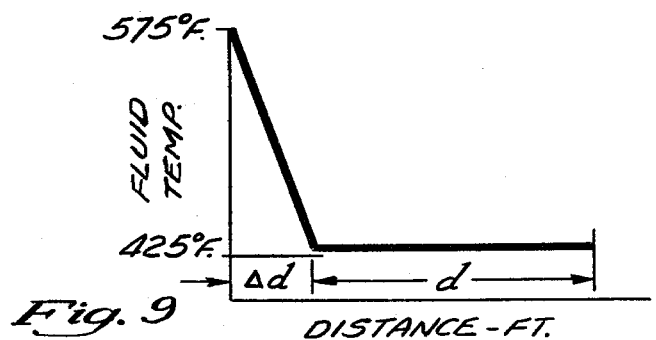
FIG. 9 is a curve showing the relationship of fluid temperature to distance behind the fluid distribution manifold of the thermal storage system of FIG. 3.

It has previously been shown that by the time the thermocline reaches the bottom of the bed it is no longer a sharp thermocline, but is somewhat diffuse, resulting in the fact that the fluid exiting the bottom begins to rise in temperature. If the flow is stopped at this point, the first fluid exiting on discharge will not be up to the required temperature until the diffused portion of the thermocline passes out of the bottom. After that, the exiting fluid temperature will be at the proper level. If the designer chooses, this situation can be avoided by making the distribution manifold longer than the value d, shown in FIG. 8, by a quantity $\Delta d$, proportional to the height of the diffuse portion of the thermocline and to the ratio $v_m/v_t$ or $\Delta d = \Delta h v_m/v_t$. This has another effect, however. During the time the diffuse part of the thermocline is exiting at the bottom, the fluid exiting from the bottom of the bed in the portion below $\Delta d$ (below the back of the manifold at A) is at a higher temperature than the bulk of the material exiting under the main part of the manifold (under d at B). When the manifold is moving steadily so that this fluid flow is nearly constant in the charging mode, the fluid temperature is a function of distance in the direction of motion of the manifold at the bottom of the bed, as shown in FIG. 9.

All of this fluid mixes together and is returned to the heater for reheating, and its temperature can easily be calculated, given relative lengths of d and $\Delta d$. For example, if $\Delta d$ is 10% of ($\Delta d + d$), the 10% of the fluid flowing will be at an average temperature half-way between the upper-to-lower nominal fluid temperatures. Upper and lower nominal fluid temperatures are 575° F. and 425° F., respectively, in this example. If 10% of the fluid is at 500° F. and 90% at 425° F., then after mixing the mixed fluid will have a temperature (assume the heat capacity of the fluid is constant with temperature) of 433° F. Thus, the fluid returns to the heater at a temperature 8° F. hotter than the nominal cold bed temperature. In most systems this will not be objectionable. The advantage is that the entire bed can be charged up to the full temperature for its entire height which is usually not possible with previous systems. Because the $\Delta T$ has been reduced by 8° F., the heat load for a given fluid flow rate is also reduced by $(8 \times 100)/150 = 5.3\%$. If the bed width and fluid flow rate are both increased by this percentage, the system is again able to receive the same heat load.

It may be desirable to not take the entire diffuse portion of the thermocline out of the bottom, but take out only ½ and allow the temperature upon extraction to drop the same amount from the nominal high level. This can be done by making $\Delta d$ only ½ as great as above, or 5% of d, and would result in a rise of only 4° F. instead of 8° F. in the returning oil. Similarly, on extraction, the extracted fluid would be 4° F. lower than the nominal storage temperature. The above illustrates the design flexibility afforded by the subject method. Furthermore, the length of $\Delta d$ can be changed by the operator if the manifold design is built to allow shutting off incremental parts of the manifold starting from the back edge. Thus, $\Delta d$ could be allowed to change to accommodate different operational requirements.

Notwithstanding the above, it is usually desirable to run the diffuse part of the thermocline entirely out of the bottom of the bed so that when the extraction mode is started the very first fluid exiting the bottom of the bed will be up to the maximum bed temperature.

Obviously, many modifications and variations of the present invention are possible in light of the above teachings. It is therefore to be understood that, within the scope of the appended claims, the invention may be practiced otherwise than as specifically described.

What is claimed and desired to be secured by Letters Patent of the United States is:

1. A thermal storage unit comprising:
   containment means;
   a quantity of particulate solid thermal storage medium disposed within said containment means;
   a source of thermal transfer fluid;
   thermal input means serving to heat said thermal transfer fluid;
   distribution means movable to deliver said thermal transfer fluid to the upper surface of said thermal storage medium in a predetermined manner;
   drainage means below said thermal storage medium for collecting said thermal transfer fluid;
   thermal output means; and
   transfer means selectably operable to transfer said thermal transfer fluid from said source through said thermal input means to said distribution means and from said drainage means to said thermal input means or to circulate said fluid through said thermal output means to said distribution means.
2. The thermal storage unit of claim 1 wherein said distribution means is a spray manifold serving to allow said fluid to trickle through said thermal storage medium.
3. The thermal storage unit of claim 1 wherein said containment means is a tank.
4. The thermal storage unit of claim 1 wherein said containment means is a trough.
5. The thermal storage unit of claim 1 wherein said thermal storage medium is rock.
6. The thermal storage unit of claim 1 wherein said thermal transfer fluid is silicone oil.
7. The thermal storage unit of claim 1 wherein said distribution means is movable to deliver fluid to said thermal storage medium in accordance with the equation $v_m = d/hv_t$ where
   $v_m$ = manifold velocity
   $v_t$ = thermocline vertical velocity
   d = manifold depth
   h = bed height of the thermal storage medium.
8. The method of storing thermal energy in a thermal storage unit having a bed of particulate solid thermal storage medium and a movable manifold for delivering thermal transfer fluid to trickle over said thermal storage medium, said method comprising the step of:
   moving said manifold to deliver said fluid to said thermal storage medium in accordance with the equation
   $v_m = d/hv_t$, where
   $v_m$ = manifold velocity
   $v_t$ = thermocline vertical velocity
   d = manifold depth
   h = bed height of the thermal storage medium
to establish a vertical thermocline in said thermal storage medium.
9. The method of claim 8 comprising the further steps of:
   allowing said fluid to trickle through said thermal storage medium; and
   collecting said fluid for distribution or recirculation.
10. The method of thermal storage comprising:
   providing a movable manifold which discharges thermal transfer fluid to trickle through a particulate solid thermal storage medium to be collected for distribution or recirculation in a manner to establish a vertical thermocline within said thermal storage medium, said thermocline being movable horizontally with said manifold.

* * * * *